Figure 4:
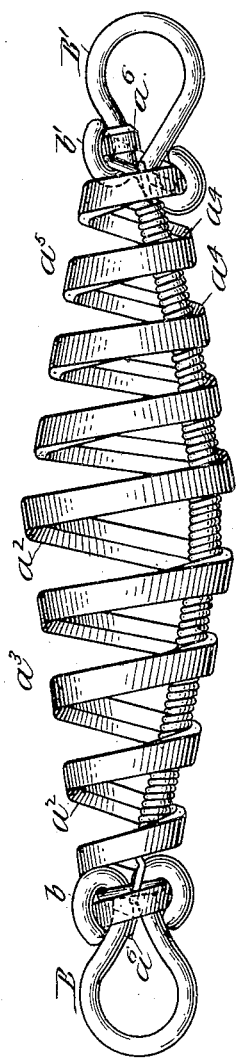

No. 813,739. PATENTED FEB. 27, 1906.
C. W. ROSS.
DEVICE FOR CUTTING VEGETABLE AND OTHER GROWTHS FROM THE INNER SURFACES OF SEWER AND SIMILAR PIPES.
APPLICATION FILED MAR. 3, 1905.
2 SHEETS—SHEET 1.
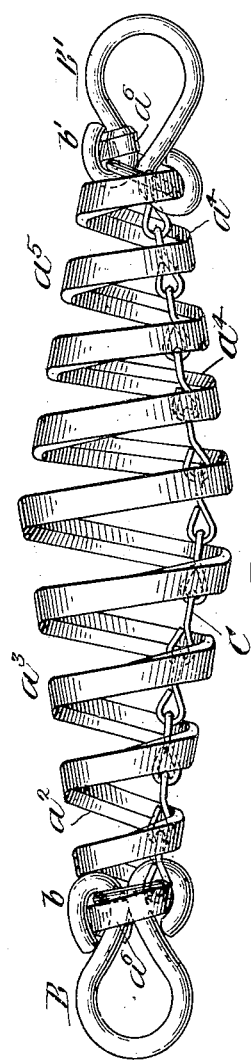
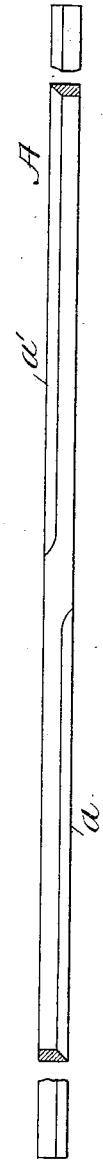
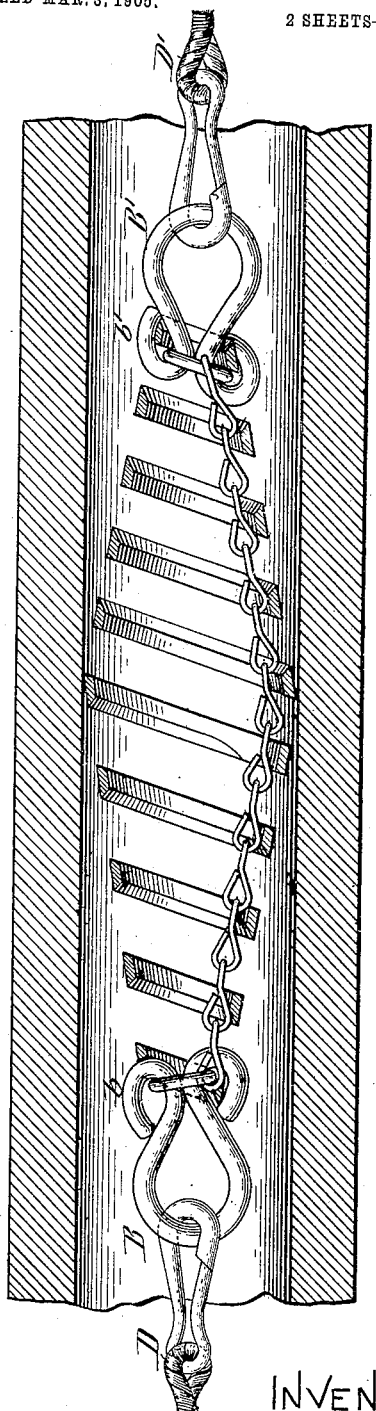
WITNESSES.
INVENTOR.

No. 813,739. PATENTED FEB. 27, 1906.
C. W. ROSS.
DEVICE FOR CUTTING VEGETABLE AND OTHER GROWTHS FROM THE INNER SURFACES OF SEWER AND SIMILAR PIPES.
APPLICATION FILED MAR. 3, 1905.

2 SHEETS—SHEET 2.

WITNESSES
INVENTOR.

ced upon it operating to slightly reduce the diameter and also to give a better cutting pitch.

UNITED STATES PATENT OFFICE.

CHARLES W. ROSS, OF NEWTON, MASSACHUSETTS.

DEVICE FOR CUTTING VEGETABLE AND OTHER GROWTHS FROM THE INNER SURFACES OF SEWER AND SIMILAR PIPES.

No. 813,739.  Specification of Letters Patent.  Patented Feb. 27, 1906.

Application filed March 3, 1905. Serial No. 248,256.

*To all whom it may concern:*

Be it known that I, CHARLES W. ROSS, a citizen of the United States, and a resident of Newton, in the county of Middlesex and State of Massachusetts, have invented a new and useful Improvement in Devices for Cutting Vegetable and other Growths from the Inner Surfaces of Sewer and Similar Pipes, of which the following is a full, clear, and exact description, reference being had to the accompanying drawings, forming a part of this specification, in explaining its nature.

Sewer-pipes and pipes for similar use are very often decreased in bore or capacity and often entirely choked by the accumulation therein of vegetable growths, which enter the pipes through the joints in them and which after such entrance continue to grow and to form a mass of roots and branches which serve to collect passing sediment and to finally create a serious obstruction. Such pipes are also often coated with matter deposited from the flowing water or sewage and also to an extent to make a stoppage of the flow. Heretofore when such pipes have become so choked it has often been necessary in order to free them from the accumulations to take up or remove sections of the pipe, which has necessitated the digging of trenches for the removal of the earth covering them in order that access to them may be had. This, of course, is an expensive undertaking as well as a slow and unsatisfactory one, even when the earth is in the best condition for removal; but when it is a part of a street pavement or when frozen in winter the labor of removal and the expense are increased. It is desirable, therefore, to free the pipes of such vegetable growths and increments without disturbing the pipes in any way and of course without removing the earth around and about them, and I have invented a device for accomplishing this purpose which in practical use I have found to answer all the necessary requirements of such removal without disturbance to the pipes; and my invention consists in an instrument a portion of which is conformable to the bore of the pipe and is provided with cutting edges reversely arranged and each shaped to have a draw cut when operated, which cutting instrument is adapted to be moved in both directions in the pipe and to operate to cut the vegetable growths and increments from the inner surface of the pipe in each direction of its movement and which instrument is also adapted to conform as to diameter to a reasonable extent to the bore of the pipe and to obstructions therein and is also adapted to conform to curves or bends in the pipe as it is being moved therein and which is also provided with limited powers or degrees of extension in whichever direction it may be drawn.

I have illustrated my invention as embodied in a bar of metal, preferably rectangular or square in form and preferably having reverse or opposing edges from its center sharpened, and which bar of metal is shaped to produce at its center the largest diameter of the cutter and from which there extend in both directions spiral extensions which are gradually reduced in size to the points of attachment, with means for connecting the ends with draft ropes, chains, or wires. These reversely-arranged spiral sections are disposed so as to bring the cutting edges of the bar in opposed relation to each other or back to back, so that when the instrument is moved in one direction the cutting edge of the bar which faces that direction will serve to cut the vegetable growths or deposits from the surface of the pipe, while upon the reverse movement of the bar the opposite cutting edge upon the opposite spiral is brought into action. It will be seen that as the cutting edge is spiral in form it acts to give or provide what is known as a "draw cut"—that is, the cutting edge bears an inclined relation to the plane of the cut—and where the cutting edge is spirally arranged there is also an additional effect obtained in that what, in effect, is a series of draw cuts are made each gradually increasing in diameter, although it will be understood that this cut is practically continuous and acts to remove the growth or deposit in what might be termed the form of a long "shaving," as produced by a plane. The implement thus has on each side a succession or multiplication of cutting-sections, each within the other and yet connected with each other in a manner to produce a continuous cut, but of different diameters, and these sections or some of them are adapted to be reduced slightly in diameter and their cutting angle somewhat varied by differences in the degree of draft to which either end of the device may be subjected, the increasing draft tending to reduce the diameter of the cutting-sections and to slightly change the angle of their cutting edge. This action is desirable in order that the instrument may readily pass over without injury to itself or to the pipe any permanent projection from the wall of the pipe or inequality therein, and as it is given a spring temper it will be understood that upon yielding to pass such an obstruction it again returns to its original shape, and that is one which causes the cutting-sections largest in diameter to automatically engage the surface of the pipe and to always return to such engagement when temporarily removed from it. These permanent projections are usually quite slight, so that it is not necessary that the device should have more than a limited amount of reduction, and this result is arrived at by attaching the ends of each of the conical sections together by means of a slack flexible connection. This may be in the form of an inextensible medium, like a chain, or it may be in the form of an additional yielding spring. Whichever means is used for this purpose, it is necessary that it should be a conformable one, as it is essential that the device should have the power of following the pipe whatever its changes in level may be or whatever curves it may possess.

I prefer that the means for providing the device with draft—such, for instance, as wires, chains, or ropes—shall be attached to the ends of the device by means of eyes or loops, to which the ends of the device are secured, preferably flexibly, and to which, preferably, its limiting means—such, for instance, as the chain—is also secured.

I will now describe the invention in conjunction with the drawings forming a part of this specification, wherein—

Figure 1 is a view of the bar from which the cutting instrument is made. Fig. 2 is a view in elevation thereof. Fig. 3 is a view showing the apparatus within a sewer-pipe. Fig. 4 is a view illustrating a modification, showing a coil-spring instead of a chain for connecting the draft-wires.

Referring to the drawings, A represents a rectangular bar of metal of the proper quality. It preferably before being formed into its ultimate shape is provided with cutting edges $a$ $a'$, extending from the center to or toward both ends and which are on opposite edges of the bar, as represented. These cutting edges are so formed that after the bar is bent or curved into its spiral form the cutting edge $a$ shall form the cutting edges $a^2$ of the spiral section $a^3$ and the cutting edge $a'$ the cutting edges $a^4$ of the spiral section $a^5$. The cutting edges of each section will accordingly be in a spiral form from the center, where the spiral is largest, to the ends, presenting, as it were, a series of cutting edges differentially and angularly arranged in their positions with respect to the longitudinal center of the device. Each end is attached to an eye, and of course there are two eyes B B'. The manner of attachment is immaterial, but is represented as secured by passing the end $a^6$ of each spiral through the small eyes $b$ $b'$ of the said eyes and by enlarging the extreme end of each spiral by turning it back upon itself, so that it will not pass through a small eye.

In Fig. 2 I have shown a restricting-chain C, contained within the coils of the device, and in Fig. 4 a restricting coil-spring. Whichever is used, its ends may be either connected with the ends of the spiral sections or with the eyes B B'. I have shown the latter construction.

D D' represent the draft wires, chains, or means by which the instrument is adapted to be drawn back and forth in the sewer or other pipe. It is operated in the pipe between two manholes, through one of which a rope, wire, or other drawing device is led to the other manhole, where it is attached to the end of the cutting apparatus, which is then inserted into the pipe and drawn from the last-named manhole through the pipe toward the first-named manhole and reciprocated in the pipe to any desired extent and until the vegetable growths and accumulations have been cut from the surface of the pipe. It will be understood that a second draft rope or wire is attached to its rear end and is drawn into the pipe with it, and the said rope or wire is used for moving it in the pipe in a reverse direction from that in which the first-named rope or wire moves it, so that by alternately drawing on one or the other of the two ropes or wires the cutting instrument is caused to be reciprocated throughout the pipe and in any part of it. Its flexible structure permits it to follow sinuosities in the pipe and to ride over permanent inequalities therein, while its extensibility permits it to conform to a limited degree to variations in the bore of the pipe. The draft ropes or wires being connected by relatively extensible connections within the instrument, the instrument itself is freed or relieved from undue strain and is therefore always maintained in a shape and condition for use.

It will be observed that the device is adapted not only to conform to the pipe as above specified and to be slightly extended under draft or strain, but that it is also automatically retractable to its original shape upon the release of strain.

While I prefer a structure of the form described, I should consider that my invention was involved if but one spiral section were used—that is, if it were so organized as to have but one spiral cutting-section. A bar of any shape that will produce when curved to a spiral shape a cutting edge may be used, and I would mention as a form of such bar one rolled or otherwise worked to a shape having a flat surface upon one side and a curved or rounded surface on the other extending from edge to edge. This provides a bar having two cutting edges. I would further say that I prefer to attach the draft ropes or wires to the ends of the cutting implement by means which permit them to be readily attached thereto and detached therefrom, and good-sized snap-hooks will answer for this purpose as well as anything, and I have represented their use in Fig. 3.

Having thus fully described my invention, I claim and desire to secure by Letters Patent of the United States—

1. A device for cutting vegetable and other growths from the inner surfaces of sewer and similar pipes, the same having a cutter presenting a series of cutting edges differentially arranged in their position with respect to the longitudinal center of said device, whereby the growth or deposit in said pipe is sliced as the device is moved or caused to operate therein.

2. A device for cutting vegetable and other growths from the inner surfaces of sewer and similar pipes, the same having a cutter presenting a series of cutting edges differentially and angularly arranged in their position with respect to the longitudinal center of said device, whereby the growth or deposit in said pipe is sliced as the device is moved or caused to operate therein.

3. A device for cutting vegetable and other growths from the inner surfaces of sewer and similar pipes, the same having a yielding cutter presenting a series of cutting edges differentially arranged with respect to the longitudinal center of said device, whereby the growth or deposit in the pipe is sliced as the device is moved or caused to operate therein, whereby also said cutter is adapted to yield or be conformable to any obstruction in said pipe.

4. A device for cutting vegetable and other growths from the inner surfaces of sewer and similar pipes, the same having an extensible cutter presenting a series of cutting edges differentially arranged in their position with respect to the longitudinal center of said device, whereby the growth or deposit in the pipe is sliced as the device is moved or caused to operate therein, and whereby also said device is adapted to yield or be conformable to any obstruction in said pipe.

5. A device for cutting vegetable and other growths from the inner surfaces of sewer and similar pipes, the same having a cutter presenting a series of cutting edges differentially arranged in their positions with respect to the longitudinal center of said device, which cutter also is extensible, and means for limiting the extension thereof.

6. A device for cutting vegetable and other growths from the inner surfaces of sewer and similar pipes, the same having a series of cutting edges arranged in a spiral coil, tapering toward the drawing end of said device, whereby as said device is moved or caused to operate in the pipe it will slice the growth or deposit therein with a spiral drawing cut.

7. A device for cutting vegetable and other growths from the inner surfaces of sewer and similar pipes comprising a metal bar bent in the form of a tapering spiral, which spiral is provided with a cutting edge, whereby the spiral is adapted to operate with a drawing cut of varying diameter as it is drawn endwise through the pipe, whereby the growth or deposit inside the pipe is sliced away.

8. A device for cutting vegetable or other growths from the inner surfaces of sewer and similar pipes comprising a metal bar bent in the form of a spiral tapering from the middle toward either end thereof, thereby forming two sections, which spiral sections are provided with cutting edges reversely disposed, whereby the spiral is adapted to operate with a drawing cut of varying diameter as it is drawn endwise in either direction through the pipe.

9. A device for cutting vegetable and other growths from the inner surfaces of sewer and similar pipes comprising a metal bar bent in the form of a spiral tapering from the middle toward either end thereof, thereby forming two sections, which sections are provided with cutting edges reversely disposed, whereby the spiral is adapted to operate with a drawing cut in opposite directions as it is drawn endwise in either direction through the pipe, which device also is extensible and the cutting edges yielding, and means inside the spiral for limiting the extension of the device while under strain or draft.

CHARLES W. ROSS.

Witnesses:
F. F. RAYMOND, 2d,
M. E. FLAHERTY.